Feb. 10, 1948.  O. T. McILVAINE  2,435,896
LIGHT RESPONSIVE BURNER CONTROL SYSTEMS
Original Filed Aug. 5, 1940
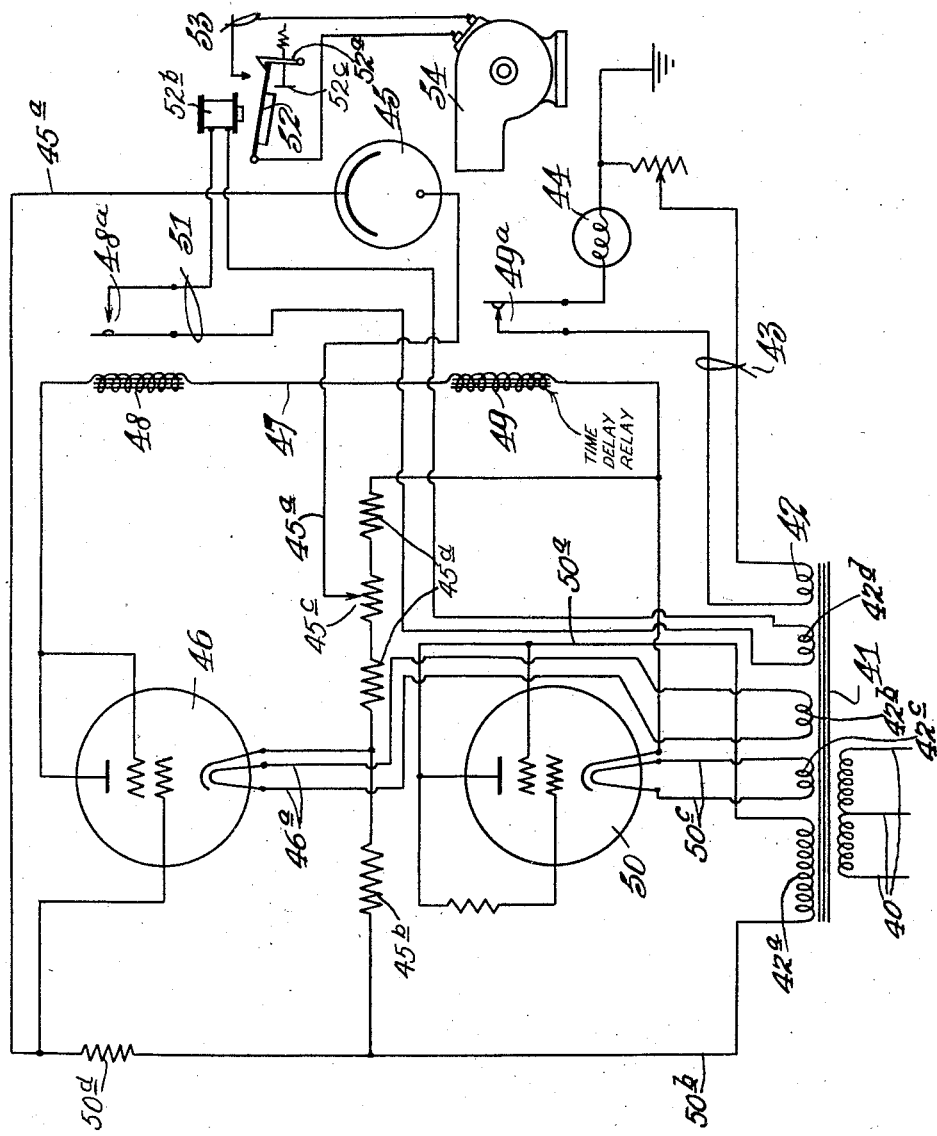
Inventor
Ivan T. McIlvaine
By
his Attorney Patented Feb. 10, 1948

2,435,896

UNITED STATES PATENT OFFICE 2,435,896

LIGHT RESPONSIVE BURNER CONTROL SYSTEM

Oran T. McIlvaine, St. Charles, Ill.

Original application August 5, 1940, Serial No. 351,459. Divided and this application July 11, 1944, Serial No. 544,396

4 Claims. (Cl. 158—28)

1

This application is a division of my prior application, Ser. No. 351,459, filed August 5, 1940, for Burner control system, now Patent No. 2,371,057, issued March 6, 1945.

This invention relates to an improvement in burner control systems, and more particularly for use as a safety system for oil or gas burners, to discontinue the operation thereof if the flame becomes extinguished.

Various attempts have been made heretofore to provide for the automatic control of the fuel to an oil or other burner in response to the operation thereof, and to some extent these have proposed the operation of the control system in response to a photo-electric cell or other light sensitive device, but such systems have not been entirely satisfactory for use.

The object of this invention is to improve the operation of the control system for a burner, whereby the operation of the burner will be responsive to the flame thereof, and yet provision is made for a definite time interval for starting and for automatically shutting off the burner if its flame does not start and continue operation during this time interval, the system being entirely fool-proof in its operation and performance.

In carrying out this object, I have provided a pair of electronic discharge tubes connected in parallel and arranged to control a pair of relays, one of the tubes functioning in response to the energizing of a photo-electric tube, and one of the relays controlling the operation of the burner, while the other relay has as one of its functions, actuation at a delayed time interval after the operation of the first relay, to prevent operation of the burner in the event that the flame thereof becomes extinguished or the burner does not function. This delayed time interval is governed by the heating or cooling intervals of the second tube, which may be varied by the substitution of different tubes, so as to change the starting interval as may be desired.

These and other features will be evident from a full description of the invention as illustrated in the accompanying drawing, which is a diagrammatic view showing an embodiment of this invention in a burner control system.

The invention is shown as comprising a series of electrical circuits so interconnected as to control the action of an oil burner, whereby the light generated by the operation of the burner controls the circuits and maintains the burner in operation. Provision is made for initiating the operation of the burner by means of a pilot lamp which is used so as to provide a time delay.

This pilot lamp and the control circuits are adapted to be energized from any suitable or available source of electrical supply, such as a power line 40, which may be provided with the usual switches for controlling the same. The power line 40 is shown as connected with the primary of a transformer 41, which transformer includes a plurality of secondary windings for the several circuits of the system, as hereinafter described.

A secondary winding 42 of the transformer 41 is connected in a circuit 43 that includes an incandescent lamp 44, as well as a relay contact switch 49a in series in the circuit. The lamp 44 forms the pilot lamp for the system but is of appreciably lower candle power than the light produced by the burner. The contact switch 49a is of the character such that it is normally closed except when the relay thereof is energized, whereby the supply of current to the transformer 41 will cause the energizing of the lamp 44, producing illumination.

The lamp 44 is arranged to furnish light to a photo-electric cell 45, the cathode of which is adapted to receive light not only from the lamp, but also from the oil burner, shown at 54.

The cathode of the photo-electric cell 45 is connected through lines 45a and 45b, through resistors 45c, 45d and 50d with a grid of an electronic discharge amplifier tube 46, so as to produce an electronic emission in the tube 46 when the tube is energized and light falls on the cathode of the photo-electric cell.

The anode of the tube 46 is connected with a line 47 that includes the coils of relays 48 and 49 in series therein, and extends to the cathode of a second electronic discharge tube 50. The anode of the tube 50 is connected through a line 50a with one side of a secondary 42a of the transformer 41, the opposite side of which secondary 42a is connected through a line 50b to the cathode of the first-mentioned amplifier tube 46. The anode of the photo-electric cell 45 is connected also with the line 50b through a line 45a.

The cathodes of the amplifier tubes 46 and 50 are shown as indirectly heated. The heater circuit of the tube 46 is designated 46a, extending to a secondary 42b of the transformer 41, while the heater circuit of the tube 50 is designated 50c, extending to a secondary 42c.

The relay 48 has a relay switch 48a that is normally open when the relay is deenergized.

The switch 48a is included in a circuit 51 that includes also in series therewith the electro-magnetic coil 52b of a switch 52 and a secondary 42d of the transformer 41 to energize the circuit 51.

The electro-magnetic switch 52 is included in a power line 53 that extends to any suitable source of power, and may be provided also if desired with the usual power line switch and thermostatic control switch. The line 53 extends to the oil burner 54, which is shown as of conventional form including an electrically operated compressor or motor, although any suitable form of burner may be used as desired. The electro-magnetic switch 52 includes a push button lock-out 52a operated by a push button 52c and adapted to hold the switch open when once deenergized until it is manually set for renewed operation.

The operator first manually releases the switch 52 by pressing the push button 52c. The light furnished by the lamp 44 causes a sufficient flow of current through the circuit 47 to cause an energizing of the relay 48 which thereupon closes the relay switch 48a in the circuit 51 to actuate the electro-magnetic switch 52 that is included in the power line 53 which extends to the burner 54, whereby the closing of the contact switch 48a will start the operation of the burner, which is ignited by the operator or otherwise. The light from the lamp 44 is not sufficient, however, to cause a flow of the needed amount of current in the circuit 47 to energize the coil of the relay 49 which is set with approximately double the tension of the relay 48, thereby requiring substantially twice as much light on the photo-electric cell for its actuation as for the relay 48. However, as soon as the burner is ignited, this additional light from the burner falls on the photo-electric cell 45, causing a sufficient electronic emission in the tube 46 to energize the relay 49, which opens the contact switch 49a and discontinues the energizing of the lamp 44.

So long as the burner continues to function, its operating circuit is maintained closed as a result of the light from its flame falling on the photo-electric cell. The burner is on safety, however, and as soon as the flame fails or becomes extinguished for any reason, the discontinuance of the light therefrom on the photo-electric cell 45 breaks the circuit through the relay 48, causing it to become deenergized and to open the contacts 48a. This deenergizes the circuit 51, releasing the switch 52 in the power circuit which has sufficient weight to fall open and breaks the supply of power to the burner, discontinuing its operation. The power switch 52 is of the type that when it is opened, it locks out and requires a manual release by means of the push button lock-out 52a.

The relay 49 is preferably constructed of the usual slug type which will cause the relay to open slowly, so as to have a one or two second delay in its opening action after the relay 48. Furthermore, it does not close the switch 49 until after the relay 48 has opened the switch 48a. After this delay, however, relay 49 closes its contact switch 49a and again energizes the pilot lamp 44 which in turn causes the relay 48 to be energized. This prepares the system for starting as soon as the operator desires. The burner does not function immediately however, until after the switch 52 has been manually released by the operator, but the system is automatic in preparing itself for renewed operation without waiting through intervals of five or ten minutes as has been necessary heretofore when heater strips and the like have been used in burner control systems.

Furthermore, it has the advantage of starting up due to the furnishing of an indefinite starting period. This can be from a few seconds to several hours, if desired, because as long as the pilot lamp furnishes light to the photo-cell, the burner motor will function until sufficient light is directed onto the cell by the flame of the burner to open the contacts and energize the relay 49. In other words, this circuit remains prepared for starting until the flame is finally ignited to the required extent. However, the failure or discontinuance of the flame at any time thereafter immediately stops the operation of the unit by opening the switch 52, which may be operated thereafter under the control of the operator.

This is of considerable advantage in a manually controlled burner because it may take a half hour or more to cause the heavy oil to flow in cold weather and ignition accomplished. This is not a dangerous period because the operator is there to ignite the flame. If the flame goes out after the operator leaves, the unit immediately discontinues the operation of the burner and remains in that condition until the operator determines the cause and again starts the burner by manually closing the switch 52.

The pilot lamp is controlled as described above so as to allow an indefinite starting period but provides complete protection immediately as soon as the flame is ignited.

The system is materially advantageous over heater strip operation used heretofore, particularly because of its quick reset and the long or short starting period, as well as the instantaneous setting on safety, as soon as the flame is ignited.

I claim:

1. A photo-electric control for starting and operating a burner, comprising a light sensitive cell, a starting pilot lamp in position to direct light onto said cell, a relay for controlling the operation of the burner and connected with the cell to operate in response to the presence of light thereon, a second relay connected in series with the first-mentioned relay and constructed for operation by a greater amount of light on said cell than is required for the first-mentioned relay, said cell being arranged to receive light from the burner flame to cause actuation of the second-mentioned relay, and means controlled by the second-mentioned relay to discontinue the lighting effect of the pilot lamp when said second relay is energized.

2. A photo-electric control for starting and operating a burner, comprising a light sensitive cell, a starting pilot lamp in position to direct light onto said cell, a relay for controlling the operation of the burner and connected with the cell to operate in response to the presence of light thereon, a second relay connected in series with the first-mentioned relay and constructed for operation by a greater amount of light on said cell than is required for the first-mentioned relay, said cell being arranged to receive light from the burner flame to cause actuation of the second-mentioned relay, and means controlled by the second-mentioned relay to discontinue the lighting effect of the pilot lamp when said second relay is energized, and a lock-out device controlled by the first relay for preventing the operation of the burner upon the discontinuance of flame thereat and adapted to be manually released.

3. A photo-electric control for starting and operating a burner, comprising a light sensitive cell, a starting pilot lamp in position to direct light onto said cell, a relay for controlling the operation of the burner and connected with the cell to operate in response to the presence of light thereon, a second relay connected in series with the first-mentioned relay and constructed for operation by a greater amount of light on said cell than is required for the first-mentioned relay, said cell being arranged to receive light from the burner flame to cause actuation of the second-mentioned relay, means controlled by the second-mentioned relay to discontinue the lighting effect of the pilot lamp when said second relay is energized, and a lock-out device controlled by the first relay for preventing the operation of the burner upon the discontinuance of flame thereat and adapted to be manually released.

4. A photo-electric control for starting and operating a burner, comprising a light sensitive cell, a starting pilot lamp in position to direct light onto said cell, a relay for controlling the operation of the burner and connected with the cell to operate in response to the presence of light thereon, a second relay connected to be energized with the first-mentioned relay and constructed for operation by a greater amount of light on said cell than is required for the first-mentioned relay, said cell being arranged to receive light from the burner flame to cause actuation of the second-mentioned relay, and means controlled by the second-mentioned relay to discontinue the lighting effect of the pilot lamp when said second relay is energized.

ORAN T. McILVAINE.

REFERENCES CITED

The following references are of record in the file of this patent:

UNITED STATES PATENTS

| Number | Name | Date |
|---|---|---|
| 1,853,444 | McCabe | Apr. 12, 1932 |
| 2,120,053 | Fehrenbach | June 7, 1938 |
| 2,304,641 | Jones | Dec. 8, 1942 |